United States Patent
Niebling et al.

(10) Patent No.: US 7,600,923 B2
(45) Date of Patent: Oct. 13, 2009

(54) WHEEL BEARING IN A WHEEL CARRIER

(75) Inventors: Peter Niebling, Bad Kissingen (DE);
Jens Heim, Bergrheinfeld (DE);
Heinrich Hofmann, Schweinfurt (DE);
Roland Langer, Schwanfeld (DE);
Darius Dlugai, Schweinfurt (DE); Horst Doeppling, Herzogenaurach (DE);
Wolfgang Steinberger, Herzogenaurach (DE)

(73) Assignee: Schaeffler KG, Schweinfurt (DE)

( * ) Notice: Subject to any disclaimer, the term of this patent is extended or adjusted under 35 U.S.C. 154(b) by 348 days.

(21) Appl. No.: 10/596,555

(22) PCT Filed: Dec. 6, 2004

(86) PCT No.: PCT/DE2004/002674

§ 371 (c)(1),
(2), (4) Date: Sep. 21, 2006

(87) PCT Pub. No.: WO2005/059388

PCT Pub. Date: Jun. 30, 2005

(65) Prior Publication Data
US 2007/0160317 A1    Jul. 12, 2007

(30) Foreign Application Priority Data
Dec. 18, 2003  (DE) ............................... 103 59 646

(51) Int. Cl.
*F16C 35/00*    (2006.01)

(52) U.S. Cl. ..................................... 384/544
(58) Field of Classification Search ................. 384/544, 384/589, 537, 542, 584; 301/105.1
See application file for complete search history.

(56) References Cited

U.S. PATENT DOCUMENTS

| | | | | |
|---|---|---|---|---|
| 3,757,883 | A * | 9/1973 | Asberg | 384/544 |
| 5,468,072 | A * | 11/1995 | Ekdahl et al. | 384/448 |
| 5,927,820 | A * | 7/1999 | Vignotto et al. | 301/105.1 |
| 6,170,919 | B1 * | 1/2001 | Hofmann et al. | 301/105.1 |
| 6,322,253 | B1 * | 11/2001 | Picca | 384/513 |
| 6,718,634 | B1 * | 4/2004 | Sadanowicz et al. | 384/589 |
| 2002/0015545 | A1 * | 2/2002 | Griseri et al. | 384/589 |

FOREIGN PATENT DOCUMENTS

| | | |
|---|---|---|
| DE | 87 02 275 Y | 4/1987 |
| DE | 39 40 395 | 6/1990 |
| EP | 0 418 532 A | 3/1991 |
| WO | 95/13198 A | 5/1995 |
| WO | 99/02873 A | 1/1999 |

* cited by examiner

*Primary Examiner*—Thomas R Hannon
(74) *Attorney, Agent, or Firm*—Lucas & Mercanti, LLP

(57) ABSTRACT

The invention relates to a wheel bearing in a wheel carrier. This wheel bearing has at least one outer race with at least one row of roll bodies, whereby the wheel bearing is supported at least on a cylindrical section of the outer race at least radial to the rotation axis in the wheel carrier, and the outer race has a flange radial pointing away from the rotation axis.

7 Claims, 3 Drawing Sheets

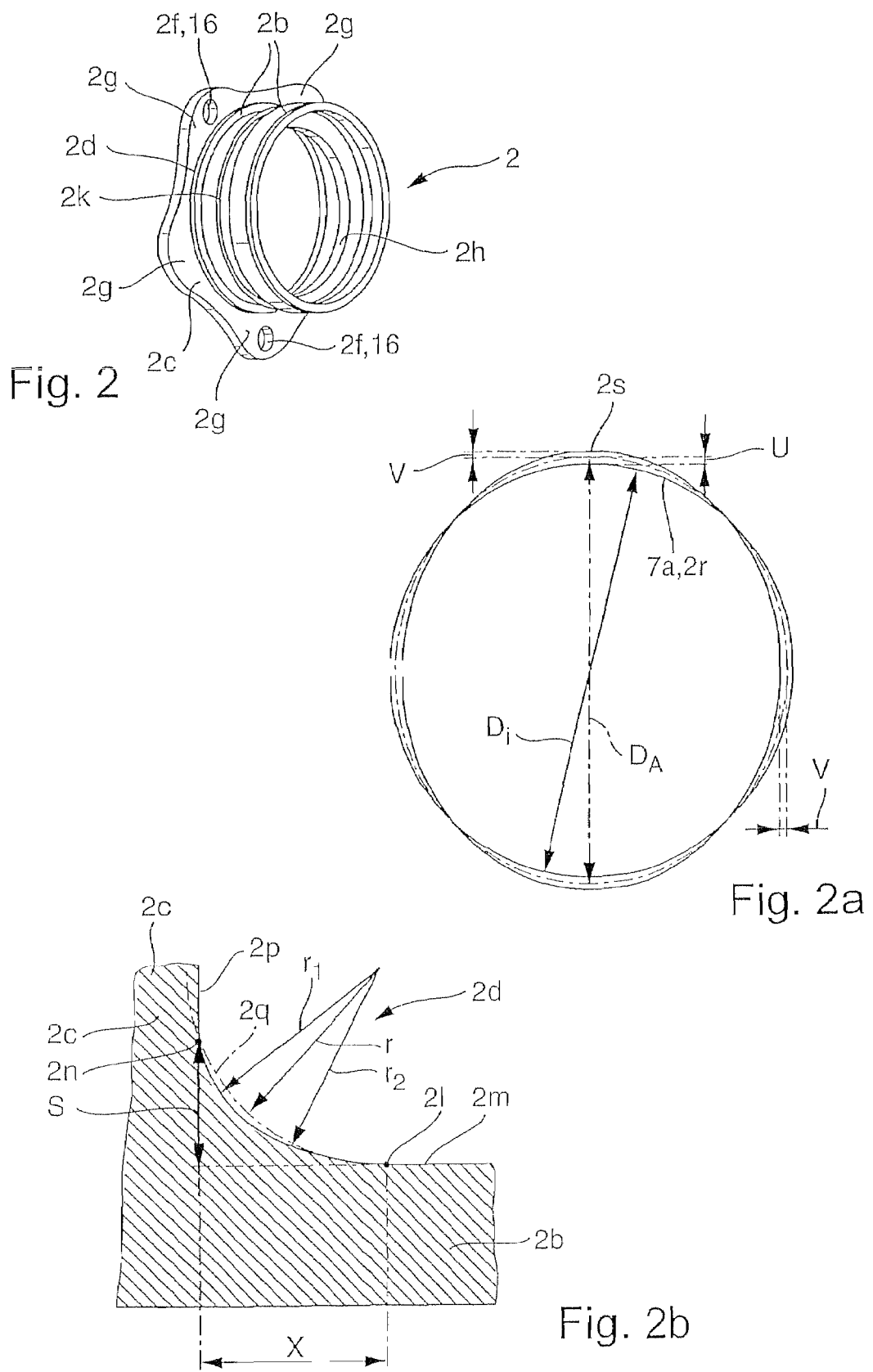

WHEEL BEARING IN A WHEEL CARRIER

FIELD OF THE INVENTION

The invention relates to a wheel bearing in a wheel carrier, the wheel bearing having at least one outer ring, having at least one row of rolling bodies, the wheel bearing being supported in the wheel carrier at least on a cylindrical section of the outer ring at least radially with respect to the rotational axis, and the outer ring having a flange which points radially away from the rotational axis.

BACKGROUND OF THE INVENTION

DE 39 40 395 A1 describes customary arrangements of wheel bearings. Wheel bearings are either accommodated completely in a wheel carrier or the like, or are suspended on a flange. Tests have shown that the wheel modules with wheel bearings which are as a rule suspended on the wheel carrier via a flange on the outer ring make up a higher weight proportion of the unsprung masses than wheel bearings which are arranged in a hole of a wheel carrier. The construction of the wheel bearings, which are suspended on the wheel carrier and are therefore at least partially self-supporting, and their suspension is to be of particularly rigid design, which results in the increased weight proportion in comparison with the wheel bearings which are accommodated in holes. DE 39 40 395 A1 thus describes a wheel bearing having an outer ring, rolling bodies and having two inner rings, whose outer ring has a radial flange axially between the end sides and away from the end sides. The wheel bearing is suspended on the wheel carrier via the flange. The wheel bearing is thus fixed axially and radially on the wheel carrier via the flange.

A hollow cylindrical section of the outer ring which adjoins the flange axially is seated moreover in a hole of the carrier, with the result that the outer ring bears against the carrier axially by means of the flange and partially radially at least with the section. The outer ring is loaded highly in the channel at the transition from the flange to the section. The channel is therefore usually rounded with a radius, by means of which notch stresses in the channel are to be reduced. However, the stresses which prevail in the channel are still excessively high, especially as the outer ring also bears against the carrier via the channel and additional stresses are built up under load in the flange as a result.

DE 39 40 395 A1 additionally describes a wheel bearing which is accommodated completely in a hole of a wheel carrier. The outer ring is of solid configuration and manufactured by material removing machining. A press fit which is customary in the roller bearing field secures the outer ring in the hole. In the case of loading of the wheel bearing during driving operation, the outer ring tends to move axially despite the press fit. To counteract this, the outer ring is secured in the hole with a securing ring on one side and is supported on an inner shoulder on the other side. The preparation of a bearing seat of this type is complicated, as the shoulder makes material removing machining difficult in the axial direction. Furthermore, the notch is to be introduced for the securing ring. The press fit also often becomes loose during driving operation, with the result that notches are produced on the carrier or on the outer ring by wear and/or the known and undesirable creaking noises occur as a result of the micromovements of the outer ring with respect to the carrier. Seats of this type also become loose if the wheel carrier is manufactured from a different material than the outer ring. This affects, for example, arrangements, in which the wheel carrier is made from an aluminum alloy and the outer ring is made from steel. The different material characteristic values, such as modulus of elasticity and coefficient of thermal expansion, of the wheel carrier with respect to the outer ring have a disadvantageous effect on a permanent firm fit of the outer ring in the wheel carrier.

Wheel bearing units (U.S. Pat. No. 3,757,883) are known, in which the inner ring and/or the outer ring are/is cold formed from sheet metal. The outer rings are of hollow cylindrical configuration about the rotational axis of the wheel bearing unit and in each case have two raceways for rolling bodies. On its side which faces away from the raceways, the outer ring has a radially outwardly oriented flange, with which the wheel bearing is fixed on the vehicle side. The inner ring is provided with a likewise outwardly oriented connecting flange as hub, to which the brake disk and the wheel of a vehicle which is driven via the inner outer ring are fastened. The raceways are introduced into the respective bearing ring in a radially at least partially recessed manner and are separated from one another by shoulders. The raceways of the angular contact ball bearing run out at the shoulders which protrude radially from the raceways.

The outer rings which are manufactured without cutting from sheet metal are of particularly solid configuration, as the bearing is fastened freely to the vehicle at one radial flange of the outer ring. The weight of the rings has a disadvantageous effect on the total balance of the unsprung masses on the vehicle. In addition, the outer rings are relatively rigid on account of their thick walls, with the result that elastic compression of the outer rings, which is desired in some circumstances, is ruled out. A bearing arrangement of this type can be prestressed without play only with extreme difficulty, on account of the high rigidity of the outer rings.

SUMMARY OF THE INVENTION

It is therefore the object of the invention to provide a wheel bearing, with the installation of which the above-mentioned disadvantages are avoided, with which, in particular, a contribution is made to saving material and reducing the weight of unsprung masses, and the durable, firm fit of which in the wheel carrier is ensured.

This object is achieved in accordance with the subject matter of claim 1.

Accordingly, that section of the outer ring, on which raceways for one or more rows of rolling bodies are formed at least partially, is supported radially completely in the wheel carrier. As a result, the entire wheel bearing is surrounded by the wheel carrier as a rule. The flange is formed axially on the end side of the outer ring and protrudes radially outward at one end of the hole. The flange either bears directly axially against the wheel carrier or is supported axially on the wheel carrier via spacer means. The wheel bearing is secured axially with respect to the carrier in the hole via the flange, as the flange is fastened to the wheel carrier with suitable fastening means. Axial movement of the outer ring during driving operation is avoided. The outer ring is seated fixedly in the carrier, as a result of which the creaking noises are avoided. Moreover, the channel at the transition from the flange to the outer ring is relieved from the outset, as the outer ring is supported radially in the wheel carrier under load. The hole in the carrier is to be machined simply with the removal of material. It is no longer necessary to introduce a shoulder for the axial contact and notches for securing rings.

In this context, wheel carriers are to be understood as all connecting constructions for wheel bearing modules and wheel bearing units of driven and nondriven wheels, to/in which the wheel bearing modules or wheel bearing units are fastened. The wheel carriers which are cast or forged or manufactured in another suitable way are manufactured from all conceivable materials, that is to say from steel and/or from aluminum alloys at least around the hole for accommodating the wheel bearing. A wheel bearing which is fixed axially on the wheel carrier according to the invention by means of the flange of the outer ring is also fixed axially if the radial seat of the wheel bearing has become loose radially, for example, in a carrier made from an aluminum alloy on account of the influence factors mentioned at the beginning.

In this context, wheel bearings are to be understood as all one row, two row and multiple row wheel bearings having rollers and/or balls as rolling bodies, having one or more inner rings of one part or multiple parts, which are configured in a very wide range of arrangements, such as in a radial ball bearing arrangement or angular contact ball bearing arrangement or as in a radial roller bearing arrangement or angular contact roller bearing arrangement. As an alternative, one or all of the inner raceways is/are not formed on one/a plurality of inner rings but is/are formed directly on a hub which is mounted in the wheel bearing.

Before the installation of the wheel bearing in the wheel carrier, the hub of a wheel bearing module for a driven or nondriven wheel is fixed in the wheel bearing, for example by a flange rim on the bearing. Here, the flange rim reaches behind the bearing arrangement in such a way that the hub is fixed on the wheel bearing such that it cannot be separated from the wheel bearing. As an alternative, the hub or a bolt, with which the wheel is mounted in the wheel bearing such that it can rotate with respect to the wheel carrier, is inserted only when the wheel bearing is fixed to the carrier.

One embodiment of the invention provides for the outer ring to be relatively thin-walled and therefore elastic in comparison with the rigid housing which surrounds the hole. The wall of the outer ring has thin cross sections. The outer ring, in particular a ring which is manufactured by cold forming, is partially hardened or is hardened overall; or an outer ring which is manufactured as desired without material removing processing after the hardening, is therefore unstable in itself or unround as an individual part on the outside and, in particular, on the inside at the raceways, in such a way that the optimum geometry which is necessary for rolling contact is not realized initially. This particularly relates to the diameter and the roundness of the section which is considered transversely with respect to the rotational axis, with which section the outer ring is pressed into the hole, before mounting in the wheel carrier. In this case, optimum geometry is to be understood as the roundness of the raceways in rolling contact, which ensures optimum rolling conditions in the bearing. Shape accuracies of this type are usually produced by turning and grinding on solid bearing rings which are machined with removal of material and the housing holes for accommodating the bearing rings. The manufacture of geometry of this type is time consuming and expensive. However, the invention provides for the finished contour of the outer ring to have, at least at the section, the above-mentioned deviations from the optimum geometry. The hole of the carrier corresponds to the optimum requirements on account of its geometry which is produced by removing material.

The deviations of the outer contour of the outer ring from the optimum geometry are compensated for by the elastic, partially plastic, behavior of the outer ring when the outer ring is pressed into the hole. To this end, the outer ring has, initially at least at the section, an external diameter which is greater than the internal diameter of the hole. The excess dimension is also required for the press fit, with which the outer ring is seated in the carrier. The outer ring is constricted radially inward by being pressed into the hole, and is adapted to the roundness of the hole. The shape accuracies of the hole and also the excess dimension are transmitted almost completely to the geometry of the raceways, as the housing of the carrier is rigid in comparison with the outer ring. The hole in the wheel carrier, which is comparatively rigid with respect to the outer ring, has substantially its initial geometry before the wheel bearing is pressed in, when the wheel bearing is seated in the hole. The functionally required roundnesses on the raceway are therefore only produced on the outer ring after the outer ring is pressed into the hole. Moreover, the elastic change in shape is also advantageous, inter alia, for the necessary freedom from play of the wheel bearing when the wheel bearing is mounted completely as a unit.

The outer ring is preferably configured in one piece with the flange, but the flange can also be fastened to the outer ring by welding or by a force transmitting and/or form fitting seat. One embodiment of the invention provides for the outer ring to be made from formed material. Accordingly, the shape of the outer ring with all its shaped elements is alternatively also produced by forming. Cutting or material removing machining is restricted in this case only to a very small amount of the machining in comparison with the amount of chipless machining. Only excess material, edges, burrs and the like are therefore removed from the shaped part by cutting or punching. Only the raceways are optionally machined in a material removing manner by precision machining such as grinding, lapping or polishing. Cold forming is to be understood as all the forming processes, in which the contour of the hollow outer ring can be manufactured by stretching or upset forging, expansion or contraction, and the shape of the starting material can be changed plastically in the process without material being cut. Processes of this type are, for example, drawing, deep drawing, rolling, pressing and combinations of the above-mentioned processes.

Tubes and metal sheets for example, are provided as blanks for the manufacture of the outer rings. A blank comprising a tube is machined to form the finished outer ring by expansion, rolling, contracting, upset forging and the folding over of edges. Outer rings which are manufactured from a metal sheet are manufactured by drawing and further individual processes mentioned above or combinations of the latter. In this case, one embodiment of the invention provides for the flange to be exactly as wide, axially from the end side of the outer ring as far as the wheel carrier against which the flange bears, as the starting material of the metal sheet was thick before the outer ring was manufactured. Preferred materials are cold formable bearing materials, such as 100Cr6 or else all suitable deep drawing steels.

The outer ring has the following shaped elements which are produced by cold forming:

- a basic body of hollow cylindrical configuration about a rotational axis of the wheel bearing unit, with the section or with a plurality of the sections,
- at least two raceways for rolling bodies,
- at least one flange which protrudes from the outer ring radially with respect to the rotational axis, the flange being configured in one piece with the sheet metal of the outer ring,
- a rim or shoulder, the rim extending about the rotational axis axially between the raceways. The rim is likewise formed in one piece from the material of the outer ring and protrudes radially between the raceways toward the rotational axis or away from the rotational axis;
- The outer ring is filled solidly on the shoulder side or is optionally provided with an annular groove. The outer ring is elastic and highly loadable in the loading direction of the rolling bodies on account of the annular groove which acts as a relief channel.

The outer ring is hardened at least partially on the raceways or else completely.

Furthermore, the outer ring is distinguished by a low weight, as starting material having a small wall thickness or small sheet thickness is used. The thickness of the starting material preferably lies in the range from 2.4 to 5 mm. The overall proportion of the wheel bearing unit in the weight of the unsprung masses is reduced by way of the thin walled outer ring which is manufactured by removing material or without cutting.

The wheel bearing for bearing driven and/or nondriven wheels on vehicles is installed with the outer ring into the wheel carrier in such a way, that the flange of the outer ring points toward the vehicle or away from the vehicle. On wheel bearings, with which driven wheels are mounted, either the flange of the outer ring alternatively bears against that side of the wheel carrier which faces the wheel flange, or the flange bears against a side of the wheel carrier which faces away from the wheel flange.

The flange is preferably fastened to the wheel carrier with bolts which, for example, are screwed or pressed into the wheel carrier. Other fastening elements are conceivable, such as clamps or the like which engage axially behind the flange at at least one fastening edge on a side of the flange which faces away from the wheel carrier. As an alternative to this, bolts are provided which are fastened to the wheel carrier by welding or screwing and onto which in each case a nut is screwed and prestressed axially against the flange. The bolts reach through axial recesses on the flange.

Different embodiments of the flange are provided with the invention. There is provision for the flange to be delimited on the outside via a cylindrical circumferential surface. Another embodiment provides a flange with radially protruding sections which adjoin one another circumferentially. In each case one of the recesses extends radially at least partly in at least two of the sections. As an alternative to this, the recesses are formed on the circumferential side between the sections.

The flange has the recesses in the form of axial holes, and as an alternative, instead of through holes, recesses which pass through the flange axially and are open radially to the outside for the fastening of the flange to a wheel carrier. The fastening elements in each case reach through one of the recesses axially from the wheel carrier and then reach behind the flange at the edge of the recesses. The weight proportion of the overall weight of the flange is therefore reduced considerably, as the material of an annular section of the flange which usually encloses the recesses on the outside is dispensed with. However, the recesses are also radially outwardly open recesses.

One embodiment of the invention provides for the contour of the recesses which are open to the outside to extend arcuately. However, as an alternative, recesses which extend radially from the outside in the manner of a slot in the direction of the rotational axis of the wheel bearing are also provided.

During the manufacture of a flange of this type, the flange which is initially provided with through holes is machined from the outside so as to remove material, for example, until the excess proportion of material which delimits the holes radially on the outside is removed from the flange. As an alternative to this, the contour according to the invention of the flange is produced by punching. This is particularly advantageous when the outer ring is cold formed. Material cutting removal of the edges is therefore superfluous. In this case, the recesses and also the other sections of the flange which are accessible radially from the outside have a punched edge from a punching operation for cutting at least the recesses.

The flange preferably bears axially against the wheel carrier only in sections. Here, the outer ring is in contact radially with a hollow cylindrical section and axially with the flange on the wheel carrier in such a way, that the wheel carrier does not bear against the concave channel, at which the flange merges into the section. Here, as viewed in a longitudinal section through the outer ring along the rotational axis of the outer ring, the concave contour of the channel merges at a first transition, for example, into a circularly annular face of the flange and at the second transition, for example, into a cylindrical circumferential face of the section. As an alternative to this, the first and the second transitions end, for example, in each case in an annular groove, which is shaped in the manner of an undercut, in the flange or in the section. Here, it is particularly significant that a perpendicular spacing between an imaginary axial extension of the circumferential surface of the flange and the first transition is smaller than a spacing which is parallel to the rotational axis between an imaginary radial extension of the circumferential surface and the second transition.

It has been proven using tests that this design of the contour reduces the maximum notch stress in the channel by approximately 30%. Here, the channel is advantageously described by at least two radii which follow one another between the transitions, at least a first radius merging radially into the flange at the transition and at least a second radius merging axially into the first section at the transition. In longitudinal section in the direction of the transitions, the radii are either separated from one another by a straight line, or preferably merge into one another between the flange and the section.

The outer ring is supported in the wheel carrier at least in sections at least radially with respect to the rotational axis in such a way, that the flange which is formed axially on the end side of the outer ring bears axially against the wheel carrier and radially against the outer ring, without the carrier being in contact with the channel. Additional stresses in the channel as a result of the influence of sharp edges of the carrier are also avoided by a chamfer of sufficient dimensions on the hole.

BRIEF DESCRIPTION OF THE DRAWINGS

FIG. 2 illustrates a perspective view of the outer ring of the wheel bearing;

FIG. 2*a* illustrates the shape deviations of the outer ring;

FIG. 2*b* illustrates an enlarged view of detail Z of FIG. 1; and

DETAILED DESCRIPTION OF THE DRAWINGS

Figure 1:
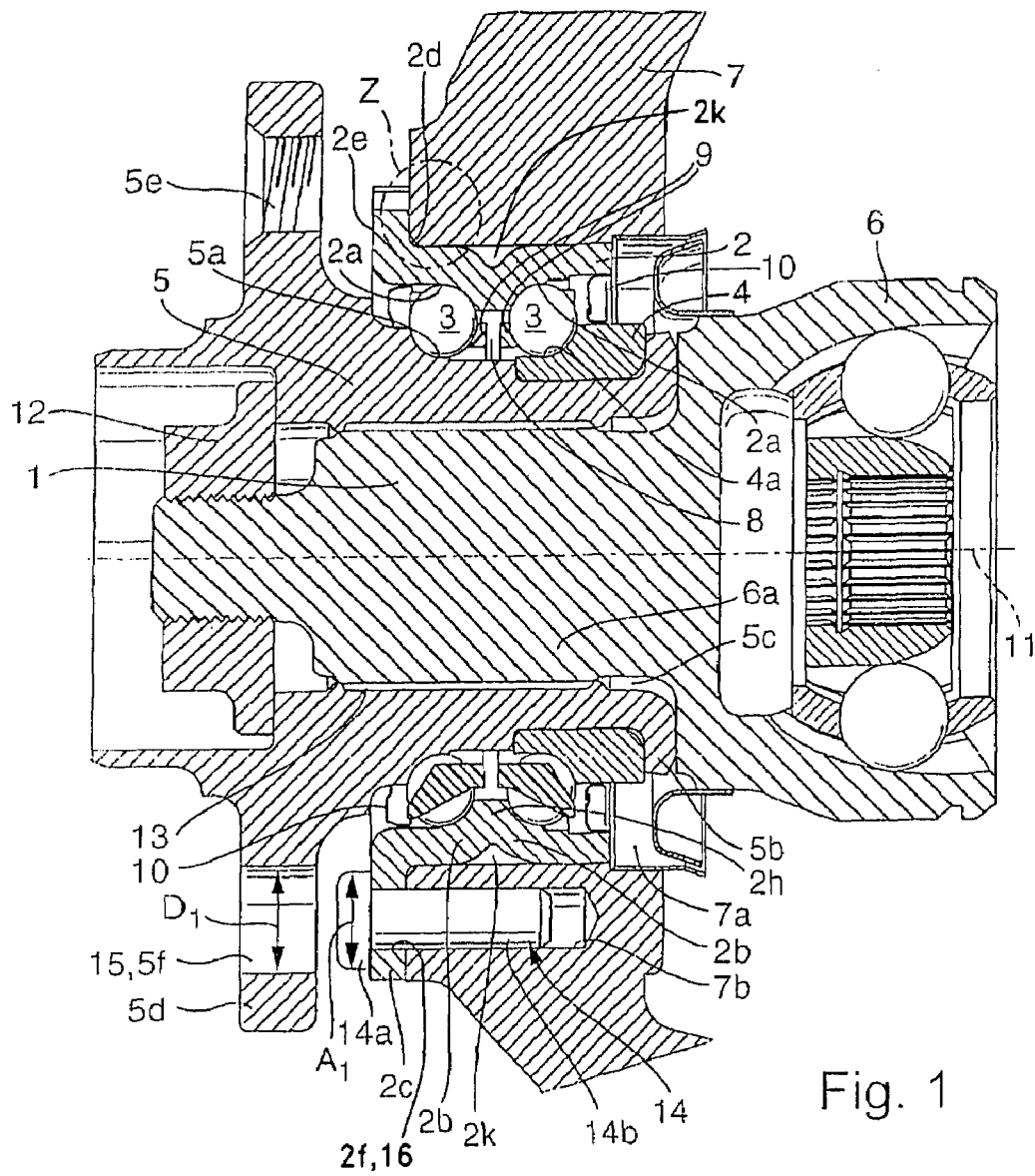
FIG. 1 illustrates the wheel bearing seated within a wheel carrier.

FIG. 1 shows a wheel bearing module 1 in a longitudinal section along a rotational axis 11. The wheel bearing module is provided with an outer ring 2, with two rows of rolling bodies 3, with an inner ring 4, with a hub 5 and with an articulation bell 6. The structural unit of the wheel bearing module which is preassembled from the individual parts 2, 3, 4, 5, 6 is seated in a wheel carrier 7.

The wheel bearing 8 comprising the outer ring 2, the rolling bodies 3, in this example in the form of balls, cages 9, seals 10, an inner ring 4 and the hub 5 is preassembled so as to hold together. To this end, the rolling bodies 3 and the inner ring 4 are held in the outer ring 2 by means of the hub 5. Here, one row of the rolling bodies 3 is supported on a raceway 2a of the outer ring 2 and on a raceway 5a which is formed directly on the hub 5. The other row of the rolling bodies 3 is arranged between a further raceway 2a and a raceway 4a of the inner ring 4. The wheel bearing 8 is prestressed without play by means of a flange rim 5b on the hub 5 via the inner ring 4 and the outer ring 2, at least when the wheel bearing 8 is mounted in the wheel carrier 7. The hub 5, in this case, is fixed nonreleasably to the wheel carrier 7 via the flange rim 5b.

The hub 5 is configured to be substantially rotationally symmetrical about the rotational axis 11 and has an axial through hole 5c. A stub 6a on the articulation bell 6 reaches through the through hole 5c axially. The articulation bell 6 is secured axially on the hub 5 via a nut 12. A wheel flange 5d which points radially to the outside is formed on the hub 5. A connection which is fixed rotationally about the rotational axis 11 is produced between the articulation bell 6 and the wheel flange 5d via tooth profiles 13 on the stub 6a and on the hub 5.

Axial holes 5e are formed on the wheel flange 5d, into which axial holes 5e wheel bolts (not shown) engage for fastening a vehicle wheel. Furthermore, the wheel flange 5d has axial recesses 5f which lie axially opposite a flange 2c at least once per revolution of the wheel flange 5d about the rotational axis 11, in such a way that the wheel flange 5d does not cover the fastening element 14 axially on account of the recesses 5f. The diameter $D_1$ of the recess 5f which is configured as an axial through hole 15 is greater than the greatest radial dimension $A_1$ of the head 14a.

The outer ring 2 is formed from two hollow cylindrical sections 2b and from the radial flange 2c. The wheel bearing 8 is supported radially in a hole 7a of the wheel carrier 7 via the sections 2b. At one of the sections 2b, the outer ring 2 merges radially into the flange 2c via a channel 2d. The flange 2c bears axially on the outside against the wheel carrier 7 and is engaged from behind by the fastening elements 14 in the form of bolts on the side 2e which faces axially away from the wheel carrier 7. The fastening element 14 is prestressed axially fixedly against the flange 2c with the head 14a, as a shaft 14b which is fixed on the bolt is fixed axially in a fastening hole 7b of the wheel carrier 7. The fastening elements 14 are optionally pressed or screwed into the fastening holes 7b.

FIG. 2 shows a complete view of the outer ring 2. The outer ring 2 is, for example, a component which is manufactured by cold forming, the flange 2c of which has radially protruding sections 2g. The recesses 2f are made in three of the sections 2g as axial through holes 16.

FIG. 2a shows the shape deviations of the outer ring 2 as an individual component in comparison with the internal geometry 2r of the hole 7a. On account of its thin wall after cold forming or after curing, the outer ring 2 has a finished external geometry 2r, the diameter $D_A$ of which is initially greater by the excess dimension 2×U than the internal diameter $D_1$ of the hole 7a. In addition, the external geometry 2s deviates by the amount 2×V from the internal geometry 2r of the hole 7a.

The outer ring 2 has a radial shoulder 2h. The radial shoulder 2h is arranged between the raceways 2a, the raceways 2a being formed at least partially on the radial shoulder 2h. An annular groove 2k is made in the outer ring 2 radially from the outside. On the one hand, the annular groove 2k is resulting from the displacement of material out of the outer ring 2 for forming the radial shoulder 2h, and on the other hand a certain elasticity is imparted to the outer ring 2 in the region of the raceways 2a. As an alternative, the shoulder 2h, instead of the annular groove, is filled completely with the material of the outer ring.

FIG. 2b, an enlarged illustration of the detail Z from FIG. 1, shows the channel 2d in an extremely enlarged illustration which is not to scale. The channel 2d is of concave configuration and merges into a circular cylindrical circumferential surface 2m of the section 2b at a first transition 2l. The channel 2d merges at the transition 2n into a circularly annular face 2p at the flange 2c. The perpendicular spacing S between the imaginary axial extension of the circumferential surface 2m and the transition 2n is smaller than a spacing X which is parallel to the rotational axis 11 between an imaginary radial extension of the circularly annular face 2p and the transition 2l.

FIG. 2b also shows that the contour of the channel 2d deviates from a contour 2q which is shown with dash dotted lines and is described by a radius r in a longitudinal section through the outer ring 2. The channel 2d is described in the longitudinal section of the radii $r_1$ and $r_2$. The radius $r_1$ merges into the flange 2 at the transition 2n and the radius $r_2$ merges axially into the section 2b at the transition 2l. The radii $r_1$ and $r_2$ merge into one another between the flange 2c and the section 2b.

Figure 2C:
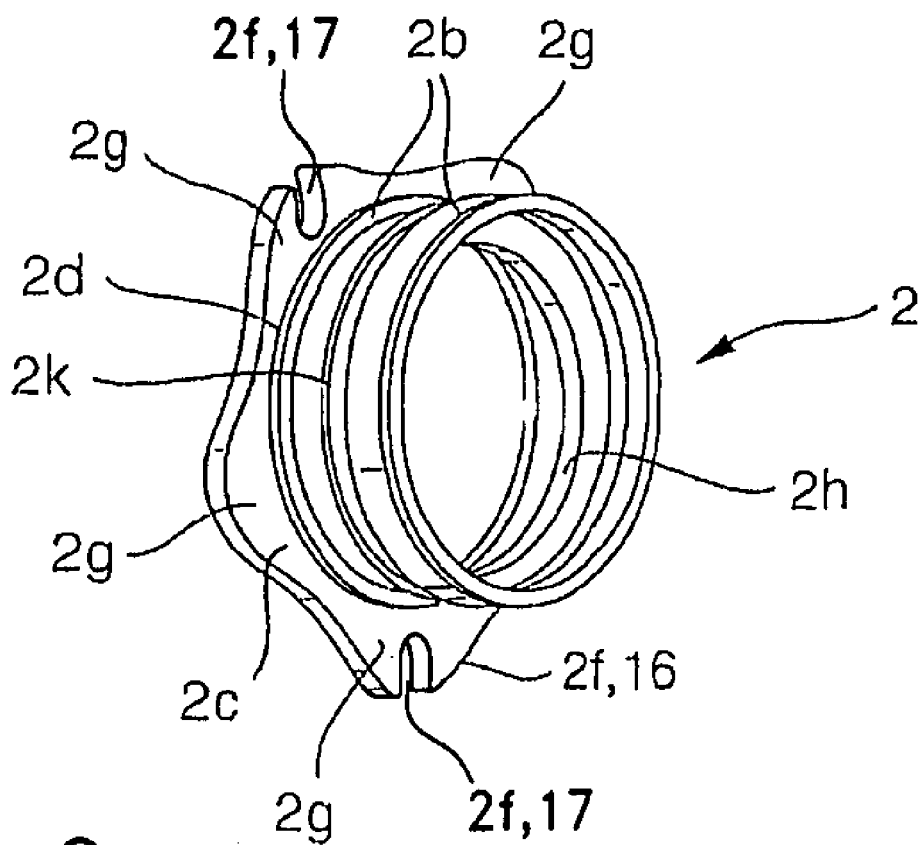
FIG. 2*c* illustrates a perspective view of the outer ring of the wheel bearing with recesses open to the outside.

FIG. 2c shows recesses 2f are made in three of the sections 2g as recesses open radially to the outside.

The wheel carrier 7 bears axially against the flange 2c and radially against the section 2b in such a way that the wheel carrier 7 and the channel 2d are spaced apart from one another at least as far as the transitions 2l and 2n. The maximum stresses radially below the recesses 2f are approximately a third higher at the contour 2q which is described by the radius r than the stresses in a channel 2d which is described by the radii $r_1$ and $r_2$.

LIST OF DESIGNATIONS

1 Wheel bearing module
2 Outer ring
2a Raceway
2b Section
2c Flange
2d Channel
2e Side
2f Recess
2g Section
2h Radial shoulder
2k Annular groove
2l Transition
2m Circumferential surface
2n Transition
2p Face
2q Contour
2r Inner geometry
2s Outer geometry
3 Rolling body
4 Inner ring
4a Raceway
5 Hub
5a Raceway
5b Flange rim
5c Through hole
5d Wheel flange
5e Holes
5f Recess
6 Articulation bell
6a Stub
7 Wheel carrier
7a Hole
7b Hole 8 Wheel bearing
9 Cages
10 Seal
11 Rotational axis
12 Nut
13 Tooth profile
14 Fastening element
14a Head
14b Shaft
15 Hole
16 Hole

The invention claimed is:

1. A wheel bearing in a wheel carrier comprising: at least one outer ring, having at least one row of rolling bodies, the wheel bearing being supported in the wheel carrier at least on a cylindrical section of the outer ring at least radially with respect to the rotational axis, and the outer ring having a flange which points radially away from the rotational axis wherein a raceway for the rolling bodies is formed, at least partially, on a radial shoulder which extends inwardly toward the axis of rotation, and the flange is formed axially on the end side of the outer ring, the flange being adapted to be axially fastened to the wheel carrier, wherein a fastening element engages at least axially behind the flange on a side of the flange which faces axially away from the wheel carrier, and the fastening element bears against the flange with a head axially to fix the flange to the wheel carrier.

2. The wheel bearing as claimed in claim 1, wherein the fastening element is a bolt with a head, the bolt with the head bearing axially against the flange by engaging through a recess of the flange, fastening the flange to the wheel carrier.

3. The wheel bearing as claimed in claim 2, wherein the recesses are open radially to the outside.

4. the wheel bearing as claimed in claim 2, wherein the recesses are holes which lead axially through the flange.

5. The wheel bearing as claimed in claim 2, wherein the flange has sections which protrude radially and are adjacent to one another circumferentially, in each case one of the recesses extending radially at least partially in at least two of the sections.

6. A wheel bearing as claimed in claim 5, wherein the flange has an odd number of radially protruding sections, having at least three of the sections with the recesses be each adjacent to one of the sections without recess.

7. A wheel bearing in a wheel carrier comprising: at least one outer ring, having at least two rows of rolling bodies, the wheel bearing being supported in the wheel carrier at least on a cylindrical section of the outer ring at least radially with respect to the rotational axis, and the outer ring having a flange which points radially away from the rotational axis, wherein a radial shoulder is formed on the outer ring between raceways for the two rows of roller bodies, the raceways for the rolling bodies is formed at least partially on the radial shoulder, and the flange is formed axially on the end side of the outer ring, the flange being adapted to be axially fastened to the wheel carrier, and wherein the radial shoulder for the raceways is formed in one piece with the outer ring between the rows, wherein the outer ring is provided on the outside with an annular groove, the annular groove extending radially partially into the radial shoulder.

* * * * *